No. 819,611. PATENTED MAY 1, 1906.
E. W. SOHLBERG.
LIGHT PROJECTING APPARATUS.
APPLICATION FILED DEC. 30, 1904.
6 SHEETS—SHEET 1.
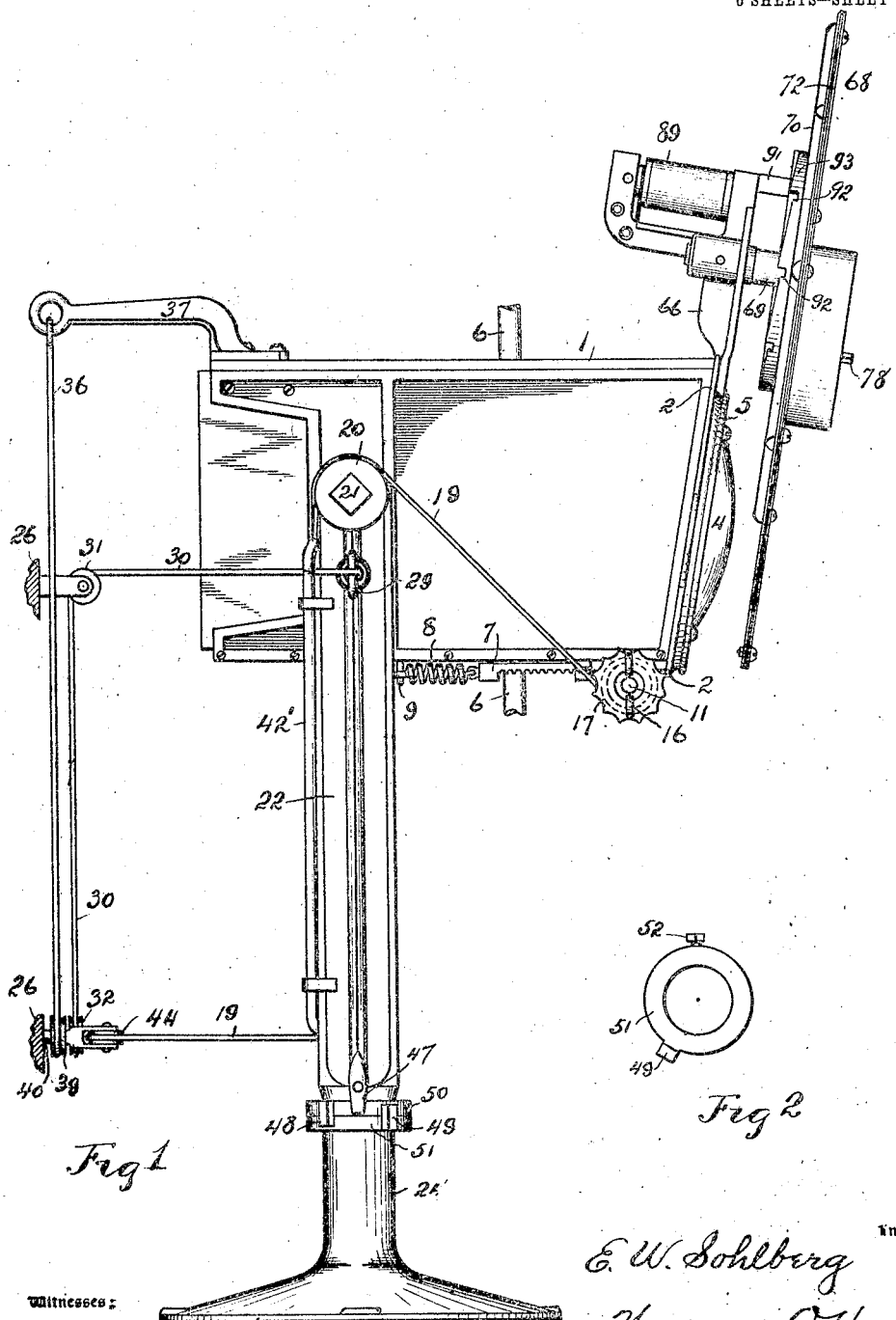

No. 819,611. PATENTED MAY 1, 1906.
E. W. SOHLBERG.
LIGHT PROJECTING APPARATUS.
APPLICATION FILED DEC. 30, 1904.
6 SHEETS—SHEET 2.
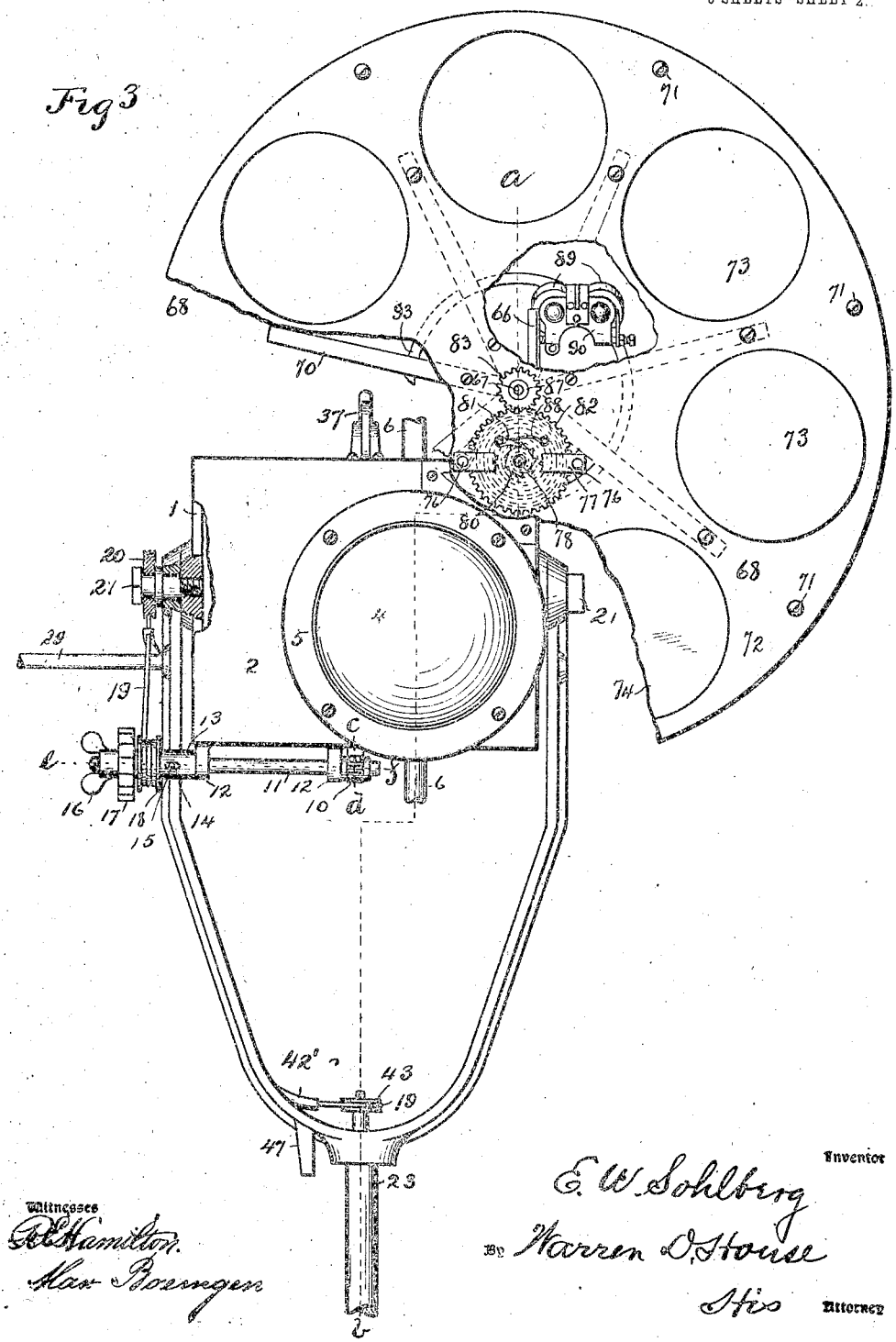

No. 819,611. PATENTED MAY 1, 1906.
E. W. SOHLBERG.
LIGHT PROJECTING APPARATUS.
APPLICATION FILED DEC. 30, 1904.
6 SHEETS—SHEET 3.
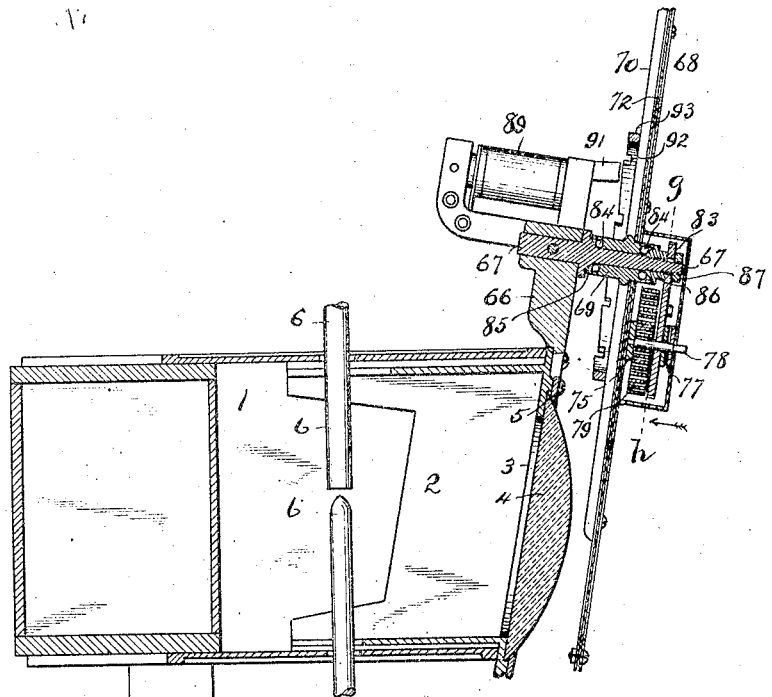

No. 819,611. PATENTED MAY 1, 1906.
E. W. SOHLBERG.
LIGHT PROJECTING APPARATUS.
APPLICATION FILED DEC. 30, 1904.
6 SHEETS—SHEET 5.
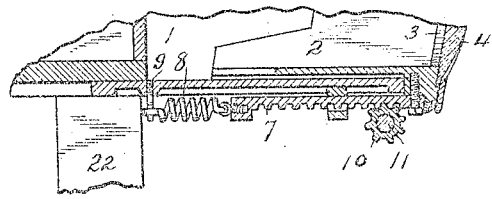
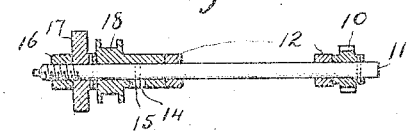
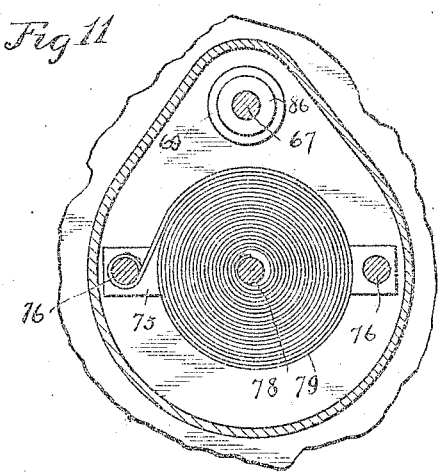
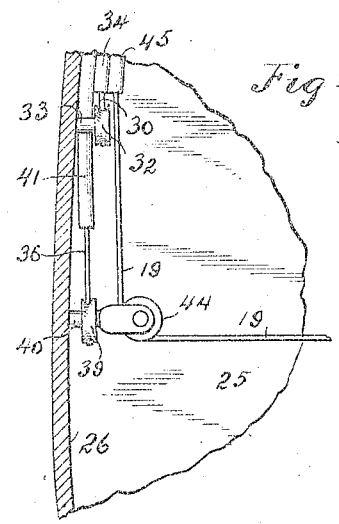
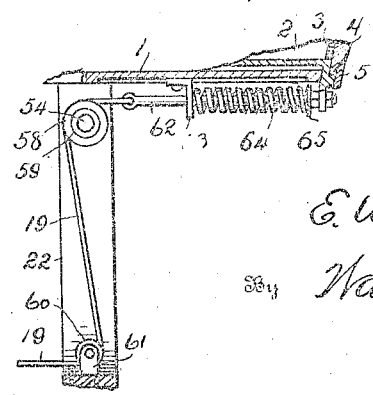
Witnesses:
R. E. Hamilton
Max Boersgen
Inventor
E. W. Sohlberg
By Warren D. House
His Attorney No. 819,611. PATENTED MAY 1, 1906.
E. W. SOHLBERG.
LIGHT PROJECTING APPARATUS.
APPLICATION FILED DEC. 30, 1904.
6 SHEETS—SHEET 6.
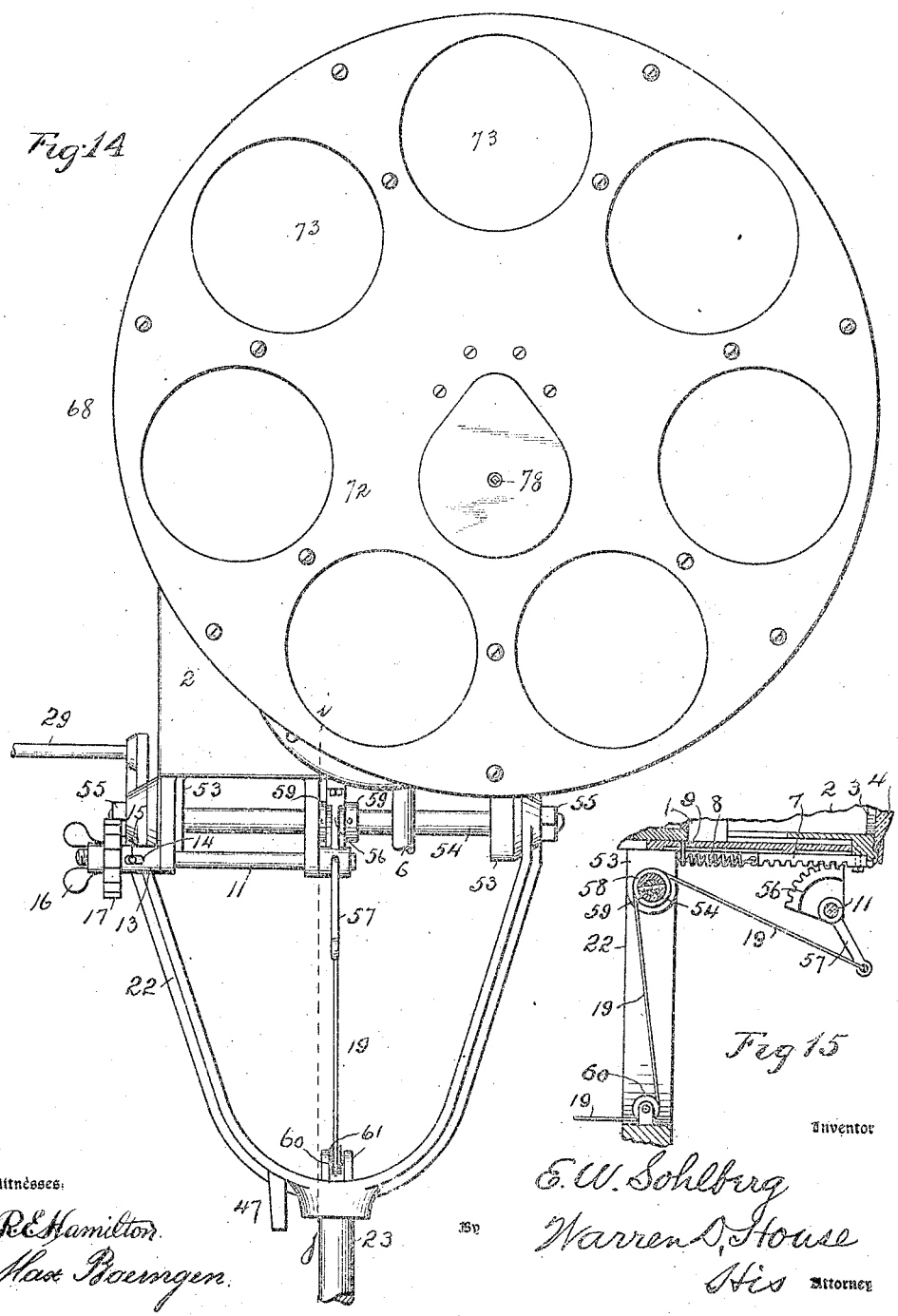

UNITED STATES PATENT OFFICE.

EDMOND W. SOHLBERG, OF KANSAS CITY, MISSOURI, ASSIGNOR OF TWO-THIRDS TO MARTIN LEHMAN AND JOSEPH L. STIEBEL, OF KANSAS CITY, MISSOURI.

LIGHT-PROJECTING APPARATUS.

No. 819,611.  Specification of Letters Patent.  Patented May 1, 1906.

Application filed December 30, 1904. Serial No. 238,923.

*To all whom it may concern:*

Be it known that I, EDMOND W. SOHLBERG, a citizen of the United States, residing at Kansas City, in the county of Jackson and State of Missouri, have invented certain new and useful Improvements in Light-Projecting Apparatus, of which the following is a specification.

My invention relates to improvements in light-projecting apparatus. It relates particularly to improvements in spot-lights, such as are used in theaters for projecting different-colored lights upon a person moving about the stage.

The object of my invention is to provide an apparatus by which an operator located at a point distant from the light-projecting mechanism—as, for instance, from some place on the stage—may quickly change the direction, color, and focusing of the rays of projected light.

With my invention an operator concealed on the stage may cause the rays of light to be projected upon and moved to and fro with any figure moving about the stage. The same operator may at the same time color the rays of light to produce the light effects desired. At the same time the operator may adjust the light-focusing mechanism so as to produce a spot of light of any desired size.

My invention provides a light-inclosing casing having an outlet for the rays of light, an adjustable focusing mechanism movable with the casing, a color-changing mechanism for intercepting the focused rays of light, and means by which an operator at a point distant from the casing may swing the same vertically and laterally, adjust the focusing mechanism, and control the action of the color-changing mechanism.

Other novel features of my invention are hereinafter fully described and claimed.

Figure 6:
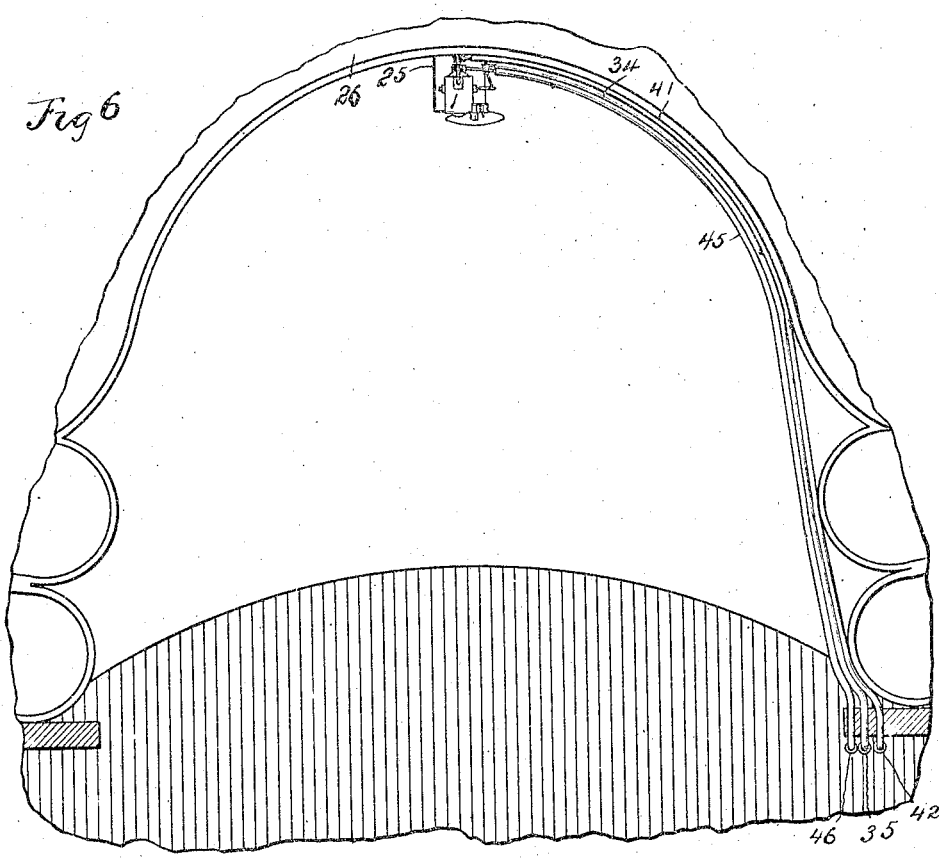
Figure 7:
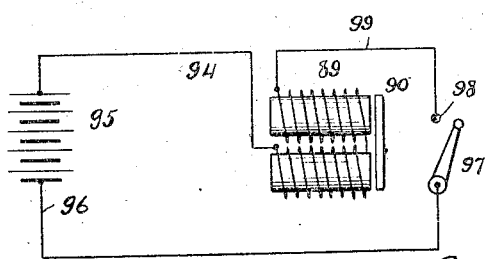
Figure 8:
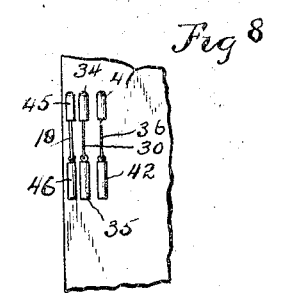

In the accompanying drawings, which illustrate my invention, Figure 1 is a side elevation view of the light-inclosing casing, the support on which it is pivotally mounted, the color-changing and the focusing mechanism, and other parts adjacent thereto. Fig. 2 is a plan view of one of the collars mounted on the "base" of the lamp, as this portion of the spot-light mechanism may be called. Fig. 3 is a front view, partly in elevation, partly in vertical section, and some of the parts broken away and removed, of the mechanism shown in Fig. 1. Fig. 4 is a vertical sectional view taken on the irregular dotted line $a\ b$ of Fig. 3. Fig. 5 is a side elevation view of the electromagnetic mechanism controlling the step-by-step movement of the color-wheel and a portion of the color-wheel. Fig. 6 is a plan view of the complete mechanism mounted in a theater, a part of the stage, balcony, and boxes of which are represented. Fig. 7 is a diagrammatic view of the electric circuit forming a part of the electromagnetic mechanism which controls the step-by-step movement of the color-wheel. Fig. 8 is a rear elevation view of the stage ends of the cords used to control the action of the light-projecting mechanism, together with the counterbalance-weights attached to the cords and the tubes in which the cords are mounted. Fig. 9 is a vertical sectional view taken on the dotted line $c\ d$ of Fig. 3. Fig. 10 is a vertical sectional view taken on the dotted line $e\ f$ of Fig. 3. Fig. 11 is a transverse sectional view taken on the dotted line $g\ h$ of Fig. 4. Fig. 12 is a plan view of the balcony ends of the actuating cords and tubes and parts connected therewith. Fig. 13 is a vertical longitudinal sectional view of the casing and parts connected therewith and a modified form of the light-focusing mechanism mounted thereon. Fig. 14 is a front elevation view of the color-wheel, the casing and parts connected therewith, and another modified form of focusing mechanism. Fig 15 is a vertical sectional view taken on the dotted line $i\ j$ of Fig. 14.

Similar characters of reference denote similar parts.

The light-inclosing casing comprises a rectangular frame 1, closed on all sides but the forward end, in which is mounted a longitudinally-reciprocative lens-frame 2, provided with a transverse hole 3 in its forward end, over which is placed a lens 4, secured in position by a ring 5, mounted on the forward end of the lens-frame. Within the casing 1, preferably in line with the axis of the lens 4, is placed any suitable light-producing device—as, for instance, an arc-light, the carbons 6 being fed toward each other by suitable mechanism which retains the arc in the axis of the lens. When the arc-light is used, the lens 4 is preferably inclined inwardly and downwardly, as shown in Fig. 4, so that the brightest part of the arc, the crater in the upper carbon, will be in the axial line of the lens.

In Figs. 1, 3, 8, 9, 10, and 12 is illustrated one mechanism for focusing the light transmitted through the lens 4 from the arc formed by the electric current passing from one to the other of the carbons 6. A horizontal rack 7, disposed longitudinally below the casing 1, has its forward end secured in any suitable manner to the lower side of the forward end of the lens-frame 2. To the rear end of the rack 7 is secured the forward end of a coil-spring 8, the rear end of which is secured to a pin 9, secured to the under side of the casing 1. The spring 8 normally tends to retract the lens-frame 2 inwardly in the casing. To force the lens-frame forward, I provide a pinion 10, which meshes with the rack 7 an is rigidly secured on a horizontal transverse shaft 11, rotatively mounted in bearings 12, provided on the under side of the casing 1. A sleeve 13 is mounted on the outer end of the shaft 11 and is provided with a longitudinal slot 14, in which is mounted a pin 15, secured to the shaft 11. The inner end of the sleeve 13 is adapted to bear against the outer side of the outer bearing 12 when the wing-nut 16, mounted on the outer threaded end of the shaft 11, is properly adjusted to force the sleeve 13 inwardly. The said nut is so adjusted only at such times as it is desired to lock the shaft 11 against rotation, and thus hold the lens 4 in a fixed position. At other times the wing-nut 16 is loose on the shaft. In order to rotate the shaft 11 by hand by a person located adjacent the casing, the sleeve 13 has secured to it a hand-wheel 17. To adjust the focusing mechanism from a point distant from the casing 1, as from a point on the stage, the sleeve 13 is provided with a grooved portion, forming a drum 18, to which is secured one end of a cord or similar device 19, which passes from the under side of the drum over a pulley 20, rotatively mounted on one of the horizontal trunnion-pins 21, which support the casing 1. A U-shaped yoke or support 22 has its upper ends embracing, respectively, opposite sides of the casing 1. Through transverse openings provided in the upper ends of the arms of the yoke 22 extend horizontal trunnion-pins 21, the inner ends of which are secured in any desired manner, respectively, to the opposite vertical sides of the casing 1. The casing 1 is thus pivoted so as to swing in a vertical plane. To oscillate the casing laterally, the yoke 22 at its lower end is provided with a vertical stud 23, rotatively mounted in a hole provided in a base 24, adapted to be secured to the upper side of a horizontal shelf 25, secured, preferably, to the balcony 26 in front of the middle of the stage 27. A coil-spring 28 encircles the stud 23, having one end secured thereto and the other end secured to the base 24. The spring 28 serves to swing the yoke 22 in one direction in a horizontal plane. To swing the yoke in the other direction, the following mechanism is employed: On one of the arms of the yoke 22 is secured the inner end of a horizontal pin 29, to the outer end of which is secured one end of a cord or similar device 30. The cord 30 passes over a pulley 31, mounted rotatively on any suitable support, as the balcony 26, thence downward over a pulley 32, rotatively mounted on a pin 33, secured to the balcony, thence through a tube 34, which is secured to the forward side of the balcony and extends rearwardly to the stage and at one side thereof. To the rear end of the cord 30 is secured a counterbalance, such as a weight 35. The coil-spring 28 and the weight 35 are counterbalances which act on the cord 30 in opposite directions. By moving the cord lengthwise in either direction the casing 1 may be swung laterally, the counterbalances 28 and 35 retaining the casing stationary in such position as it may be moved to when the cord is released by the operator stationed on the stage adjacent the weight 35. The casing 1 is preferably mounted in the yoke 22 with a preponderance of weight forward of the trunnion-pins 21, such weight acting as a counterbalance for swinging the forward end of the casing downward. To swing the casing in the other direction, a cord 36 is secured at one end to an arm 37, secured to the top and rear end of the casing 1. Said cord 36 passes downward around a pulley 39, mounted on a horizontal pin 40, secured to the balcony 26, thence through a tube 41, which it disposed parallel with the tube 34 and having a counterbalance, such as a weight 42, secured to its rear end. By moving the cord 36 lengthwise to and fro the casing 1 may be vertically oscillated, the weight of the forward end of the casing and the weight 42 serving to retain the casing in the position to which it may be adjusted. The cord 19 passes from the pulley 20 downwardly through a tube 42', secured to one of the arms of the yoke 22, thence around a horizontal pulley 43, rotatively mounted upon a vertical projection on the stud or bolt 23. The cord 19 passes thence over a horizontal pulley 44, rotatively mounted between the arms of the bifurcated forward end of the pin 40, thence into and through a tube 45, secured to the balcony parallel with the tube 34. To the inner end of the cord 19 is secured a counterbalance comprising, preferably, a weight 46. By moving the cord 19 to and fro the lens-frame 2 may be reciprocated in the casing 1, the counterbalances 46 and spring 8 serving to reciprocate the said frame and to retain it in a position to which it may be adjusted. Oscillatory movement of the yoke 22 on the base 24 is limited in either direction by means of a downwardly-extending projection 47, disposed on the outside of the lower end of the yoke and between two vertical projections 48 and 49, provided, respectively, on two collars 50 and 51, circumferentially adjustable upon the upper end of the base 24. The projections 48 and 49 extend, respectively, downwardly and upwardly, so as to lie in the path of the projection 47. Each collar is provided with a set-screw 52, by which the collar is rigidly secured in a position to which it may be adjusted on the base 24. By circumferentially adjusting the collars 50 and 51 the horizontal swinging of the yoke 22 may be limited.

In Figs. 14 and 15 I have illustrated a modified form of the focusing mechanism. In this form of my invention the casing 1 is provided with two projections 53 on the lower side thereof, provided, respectively, each with a transverse hole through which extends a horizontal bar 54, the ends of which are screw-threaded and extend through openings provided in the upper ends of the arms of the yoke 22. On the threaded ends of the bar 54 and bearing upon the outer sides of the arms of the yoke 22 are two nuts 55, respectively. On the shaft 11 is rigidly secured a segmental gear 56, the teeth of which mesh with the rack 7, already described, said segmental gear being provided on the side diametrically opposite its peripheral teeth with an arm 57, to which is secured the end of the cord 19, which passes thence over the pulley 58, rotatively mounted on the bar 54 and secured against longitudinal movement thereon by means of two collars 59, secured, respectively, one at each side of the pulley 58 on the bar 54. The cord 19 passes from the pulley 58 around a vertical pulley 60, rotatively mounted between two vertical projections centrally disposed upon the upper side of the yoke 22. The cord 19 passes from the pulley 60 rearwardly over the pulley 44, hereinbefore described, and through the tube 45 and has secured to its rear end the weight 46. To move the lens-frame 2 forward, the cord 19 is rearwardly pulled, thus swinging the segmental gear 56, so as to force the rack 7 forward. Retraction of the rack 7 and the frame 2 is obtained by raising the weight 46, when the spring 8 will retract the rack.

In Fig. 13 I have illustrated another form of focusing mechanism having some of the parts common to the other two forms already described. In this form of my invention a cord 19 passes over the pulley 60, as described, and over the pulley 58, mounted on the transverse bar 54, the construction and mounting of which is already described, to the rear end of a horizontal rod 62, to which the cord 19 is secured. The said rod 62 is slidably mounted in a transverse horizontal hole provided in a bracket 63, secured to the under side of the casing 1. The forward end of the rod 62 is rigidly secured to the lower end and forward portion of the frame 2. Encircling the rod 62 is a coil-spring 64, the forward end of which bears against a washer 65, mounted on the forward end of the rod 62, and the rear end of which bears against the forward side of the bracket 63. In this form of my invention to retract the lens-frame 2 the cord 19 is pulled rearwardly, thus retracting the rod 62 and frame 2 against the pressure of the spring 64. By raising the weight 46 the spring 64 will force the lens-frame 2 forward.

I will now describe the light-color-changing mechanism. Mounted on the upper forward end of the lens-frame 2 is a bracket 66, provided with a forwardly-extending rigid stud 67, on which is rotatively mounted in front of the bracket 66 the color-wheel 68. The said color-wheel comprises a central hub 69, provided with radial arms 70, to the forward side of which are secured, by means of screws 71, two disks 72, provided, respectively, with oppositely-disposed holes 73, disposed at equal distances apart and in positions such that when the color-wheel is rotated said holes will pass consecutively in front of the lens 4. Between the disks 72 and disposed, respectively, so as to cover the holes 73 may be slipped a series of colored plates 74, a part of one of which is shown in Fig. 4. These plates may be of different colors. Rotation step by step of the color-wheel 68 may be obtained in any desired manner. In the drawings I have illustrated one mechanism by which rotation of the color-wheel is obtained.

Referring particularly to Figs. 1, 3, 4, 5, and 11, 75 denotes a transverse plate secured to two of the arms 70 and having secured at right angles to its ends respectively two forwardly-extending posts 76, to the outer ends of which is secured a transverse plate 77. Rotatively mounted between and extending through the plates 75 and 77 is a shaft 78, to which is secured one end of a coil-spring 79, which encircles said shaft and has its other other end secured to one of the posts 76. Rigidly mounted on the shaft 78 is a ratchet-wheel 80, in the teeth of which engages a pawl 81, pivoted upon the forward side of the spur gear-wheel 82, rotatively mounted upon the shaft 78 and meshing with the teeth of a pinion 83, rigidly secured upon the forward end of the stud 67. The opposite ends of the hub 69 are recessed and form bearing respectively for two series of pawls 84, the rear set of which bear upon a cone 85, integral with the stud 67, and the forward set of which bear upon a cone 86, having a longitudinal screw-threaded hole fitted to the screw-threaded outer end of the stud 67. A lock-nut 87, mounted upon the outer end of stud 67, clamps the pinion 83 between said lock-nut and the cone 86. When the spring 79 is wound either by rotating the shaft 78 or the entire wheel 68 in the proper direction, the tension of the spring will cause rotation of the color-wheel through the intermediacy of the post 76, shaft 78, ratchet 80, pawl 81, spur-gear 82, and pinion 83, secured to the stud 67. The pinion 83, being secured to the stud 67, cannot rotate, so the spur-gear 82 will travel around the pinion during rotation of the wheel. The pawl-and-ratchet mechanism is provided in order that the spring 79 may not become broken in the event that the color-wheel accidentally escapes from the control of the mechanism which governs its step-by-step rotation. To retain the pawl 81 in engagement with the ratchet 80, a spring 88 has one end secured to the gear 82 and the other end bearing upon the outer side of the said pawl.

I will now describe the electromagnetic mechanism which controls the step-by-step rotation of the color-wheel. Rigidly mounted on the bracket 66 is an electromagnet 89, comprising two coils forming part of an electric circuit and provided with a pivoted armature 90 of any ordinary type. To the upper end of the armature 90 is secured a forwardly-extending arm or pawl 91, adapted to enter consecutively a series of notches 92, provided at suitable intervals in the rear side of a ring 93, provided on the color-wheel 68 and concentric with the stud 67. The pawl 91 and the recesses 92 are so disposed that when the pawl 91 is in one of said recesses one of the holes 73 of the color-wheel will be in front of the lens 4. To one of the coils 89 is connected one end of a line-wire 94, the other end of which is connected to one pole of a battery 95 or other electric generator, the other pole of which is connected to one end of a conductor 96, the opposite end of which is connected to a switch-lever 97, adapted to close the circuit by being swung against a contact 98, connected to one end of a conductor 99, the other end of which is connected to the other coil of the magnet 89, the two magnet-coils being connected together in the ordinary manner. To the lower end of the armature 90 is secured the forward end of a retracting-spring 100, the rear end of which is secured to an adjusting-screw 101, fitted in a screw-threaded hole provided in a plate 102, supported in any desired manner from the bracket 66.

In operating my invention the casing 1 is oscillated vertically and laterally by moving the cords 30 and 36 lengthwise in the proper directions in the manner hereinbefore described. The lens 4 is then adjusted to the proper position relative to the light-producing device in the casing 1 by moving the cord 19 lengthwise in the proper direction and to the place in which a spot-light of the proper size is obtained by means of the lens 4. The switch-lever 97 is then caused to make contact with the contact 98, thus closing the circuit in which the electric generator 95 is located, thus energizing the magnet 89 and causing the armature 90 to be swung rearwardly at its upper end and withdrawing the pawl 91 from the notch 92, in which it is located. The spring 79 will then cause the color-wheel to be rotated in the manner hereinbefore described, after which the switch-lever 97 will be swung out of contact with the contact 98 and permitting the spring 100 to retract the armature 90 and force the pawl 91 again against the notched ring 93, where it will enter the next notch 92, thus stopping rotation of the color-wheel. This operation may be repeated until the step-by-step rotation of the color-wheel has brought the plate 74 of the color desired before the lens 4, at which time the projected rays will be of the color desired.

It will thus be observed that by properly opening and closing the electric circuit in which the magnet 89 is located step-by-step rotation of the color-wheel may be obtained. It will be noted that as the bracket 66 is mounted on the frame 2 the relative distance between the lens 4 and the color-wheel 68 remains the same irrespective of the operation of the focusing mechanism.

Having thus described my invention, what I claim, and desire to secure by Letters Patent, is—

1. In a light-projecting apparatus, the combination with a casing for inclosing an electric or other light-producing device and having an outlet for the rays of light, a support on which the casing is pivotally mounted, a base on which the support is pivotally mounted with its axis at an angle to the axis of the casing, a focusing device movable on the casing toward and from the light-producing device, a color-wheel rotatively mounted on the casing and adjustable with the focusing device and provided with a series of light-transmitting devices adapted when the wheel is rotated to intercept consecutively the focused rays of light, means for effecting movement to and fro of the focusing device, means for effecting oscillation respectively of the casing and support, and electromagnetic means for controlling the rotation of the color-wheel.

2. In a light-projecting apparatus, the combination with a casing for inclosing an electric or other light-producing device, of means for effecting oscillation of said casing in two planes disposed at angles to each other, a light-focusing device carried by said casing and adjustable toward and from the light-producing device, a color-wheel rotatively mounted on the casing and adjustable with the focusing device and adapted to intercept the focused rays of light, means for effecting rotation of said color-wheel, and electromagnetic means for controlling step-by-step rotation of said color-wheel.

3. In a light-projecting apparatus, the combination with a casing for inclosing a light-producing device having an outlet for the rays of light, of a support on which the casing may be vertically and laterally oscillated, means for effecting such oscillation, a rotary color-wheel longitudinally movable in line with said outlet, means for rotating the color-wheel, and means by which an operator located at a point distant from the casing may control the vertical and lateral oscillation of the casing and the rotation of the color-wheel respectively.

4. In a light-projecting apparatus, the combination with a casing for inclosing a light-producing device and having an outlet for the rays of light, of a support on which the casing may be vertically and laterally oscillated, means for oscillating vertically and laterally the casing, a light-focusing device movable with the casing and movable toward and from the light-producing device in line with said outlet, a color-wheel movable with the focusing device and rotatively mounted in a position for intercepting the rays projected from the focusing device, means for rotating the color-wheel, and means by which an operator located at a point distant from the casing may control the vertical and lateral oscillation thereof, the reciprocation of the focusing device and the rotation of the color-wheel respectively.

5. In a light-projecting apparatus, the combination with a casing for inclosing the light-producing device and having an outlet for the rays of light, of a support on which the casing may be vertically and laterally oscillated, a light-focusing device movable with the casing and reciprocative toward and from the light-producing device, a rotary color-wheel movable with the focusing device, means for rotating the color-wheel, means for reciprocating the focusing device, means for vertically and laterally oscillating the casing, and electromagnetic means controlling the rotation of the color-wheel.

6. In a light-projecting apparatus, the combination with a casing for inclosing a light-producing device and having an outlet for the rays of light, of means for vertically and laterally oscillating the casing, a color-wheel movable with the casing and adjustable toward and from the light-producing device and disposed so as to intercept the rays of light projected therefrom, means for rotating the color-wheel and means for controlling the step-by-step rotation of the color-wheel.

7. In a light-projecting apparatus, the combination with a casing for inclosing an electric or other light-producing device and having an outlet for the rays of light, of means for vertically and laterally oscillating the casing, a color-wheel movable with the casing and adjustable toward and from the light-producing device and disposed so as to intercept the rays of light projected therefrom, means for rotating the color-wheel, and electromagnetic means for controlling the step-by-step rotation of the color-wheel.

8. In a light-projecting apparatus, the combination with a casing for inclosing a light-producing device and having an outlet for the rays of light, of means for vertically and laterally oscillating the casing, a color-wheel movable with the casing and adjustable toward and from the light-producing device and disposed so as to intercept the rays of light projected therefrom, a spring, means by which when proper tension is imparted to the spring the color-wheel may be rotated, and means for controlling the step-by-step rotation of the color-wheel.

9. In a light-projecting apparatus, the combination with a casing having an outlet for rays of light, of means for vertically and laterally oscillating the casing, a color-wheel movable with the casing and adjustable toward and from the light-producing device and disposed in front of said outlet, a spring, means by which the tension of the spring may impart rotation to the color-wheel, and electromagnetic means controlling the wheel-rotating means.

10. In a light-projecting apparatus, the combination with a casing for inclosing a light-producing device and having an outlet for the rays of light, of means for vertically and laterally oscillating the casing, a color-wheel movable with the casing and adjustable toward and from the light-producing device and provided with a series of light-transmitting devices adapted to pass consecutively in front of said outlet when the color-wheel is rotated, means for rotating the color-wheel, and means controllable by an operator located at a point distant from the casing for controlling the rotation of the color-wheel so that the same will rotate step by step and bring the light-transmitting devices of the color-wheel consecutively before the outlet of the casing.

11. In a light-projecting apparatus, the combination with a casing for inclosing a light-producing device and having an outlet for the rays of light, of means for vertically and laterally oscillating the casing, a rotary color-wheel movable with the casing and adjustable toward and from the light-producing device and provided with a series of light-transmitting devices disposed so as to pass consecutively before said outlet when the color-wheel is rotated step by step, means for rotating the color-wheel, and electromagnetic means controlling the step-by-step rotation of the color-wheel.

12. In a light-projecting apparatus, the combination with a casing for inclosing a light-producing device and having an outlet for the rays of light, of a color-wheel movable with the casing and provided with a series of light-transmitting devices adapted to pass consecutively in front of said outlet when the color-wheel is rotated step by step, electromagnetic means controlling the rotation of the color-wheel, and a light-focusing device disposed so as to intercept the rays of light transmitted through the color-wheel and adjustable with the color-wheel toward and from the light-producing device.

13. In a light-projecting apparatus, the combination with a casing for inclosing a light-producing device and having an outlet for the rays of light, of means for vertically and laterally oscillating the casing, a color-wheel movable with the casing and provided with a series of light-transmitting devices adapted to pass consecutively in front of said outlet when the color-wheel is rotated step by step, electromagnetic means controlling the step-by-step rotation of the color-wheel, a light-focusing device disposed in front of said outlet and reciprocative toward and from the light-producing device, and means for reciprocating the focusing device.

14. In a light-projecting apparatus, the combination with a light-inclosing casing having an outlet for the rays of light, of a light-focusing device reciprocative toward and from a light-producing device adapted to be placed in the casing, a color-wheel mounted on said light-focusing device and provided with a series of light-transmitting devices adapted to pass in consecutive order before said outlet when the color-wheel is rotated step by step, means for oscillating the casing, means for reciprocating the focusing device and means for controlling the step-by-step rotation of the color-wheel.

15. In a light-projecting apparatus, the combination with a casing for inclosing a light-producing device, and having an outlet for the rays of light, of a light-focusing device reciprocatively mounted on the casing in line with said outlet, a rotary color-wheel carried by the focusing device and provided with a series of light-transmitting devices adapted to pass consecutively in front of said outlet when the color-wheel is rotated step by step, means for rotating the color-wheel, electromagnetic means controlling the step-by-step rotation of the color-wheel, means for reciprocating the focusing device, and means for oscillating the casing.

16. In a light-projecting apparatus, the combination with an oscillatory casing for inclosing a light-producing device and having an outlet for the rays of light, of a light-focusing device reciprocative toward and from the light-producing device and oscillatable with the casing, a color-wheel reciprocative with the focusing device and provided with a series of light-transmitting devices adapted to pass consecutively in front of said outlet when the wheel is rotated step by step, means for rotating the color-wheel, electromagnetic means for controlling the step-by-step rotation of the color-wheel, three cords or similar devices each reciprocative lengthwise, and means by which when said cords are respectively reciprocated the casing may be oscillated vertically and laterally, and the focusing device reciprocated.

17. In a light-projecting apparatus, the combination with a light-inclosing casing having an outlet for the rays of light, of a lens-frame reciprocatively mounted on the casing, a lens carried by said frame and disposed in front of said outlet, means for reciprocating said lens-frame, a color-wheel rotatively mounted on the lens-frame and provided with a series of light-transmitting devices adapted to pass consecutively in front of the lens when the color-wheel is rotated step by step, an electromagnetic means controlling the step-by-step rotation of the color-wheel, means for rotating the color-wheel, and means for oscillating the casing vertically and laterally.

18. In a light-projecting apparatus, the combination with a light-inclosing casing provided with an outlet for the rays of light, of means for focusing said rays of light, a color-wheel carried by the focusing means and provided with a plurality of light-transmitting devices adapted to pass consecutively in the path of the focused rays of light, an electromagnet provided with an armature adapted to engage and control the rotation of the color-wheel when the magnet is energized, means for energizing the electromagnet, and means for oscillating the casing vertically and laterally.

19. In a light-projecting device, the combination with a light-inclosing casing provided with an outlet for the rays of light, of a support on the casing, a color-wheel rotatively mounted on the support, and provided with a plurality of light-transmitting devices adapted to pass consecutively before the said outlet when the color-wheel is rotated step by step, a stationary pinion mounted on said support, a gear-wheel rotatively mounted on the color-wheel and engaging the pinion so as to have a planetary movement around the pinion, means for rotating the gear-wheel, and means for controlling the step-by-step rotation of the color-wheel.

20. In a light-projecting apparatus, the combination with a light-inclosing casing having an outlet for the rays of light, of a support on the casing, a color-wheel rotatively mounted on said support and provided with a plurality of light-transmitting devices adapted to pass consecutively in front of the said outlet, a stationary pinion mounted on said support, a gear-wheel rotatively mounted on the color-wheel and meshing with said pinion and disposed on the color-wheel so as to have a planetary movement around the pinion when the color-wheel is rotated, means for rotating the gear-wheel, and electromagnetic means controlling the step-by-step rotation of the color-wheel.

21. In a light-projecting apparatus, the combination with a light-inclosing casing having an outlet for the rays of light, of a support mounted on the casing, a color-wheel rotatively mounted on the support and having plurality of light-transmitting devices adapted to pass consecutively in front of the outlet when the wheel is rotated, a stationary pinion mounted on the said support concentrically with the color-wheel, a gear-wheel rotatively mounted on the color-wheel and meshing with the pinion, a spring supported by the color-wheel, means for imparting rotation to the gear-wheel by the tension of said spring, and means for controlling step-by-step rotation of the color-wheel.

22. In a light-projecting apparatus, the combination with a light-inclosing casing having a light-outlet, of a support on said casing, a color-wheel rotatively mounted on said support, and having a plurality of light-transmitting devices adapted to pass consecutively before the said outlet when the color-wheel is rotated, a stationary pinion mounted on said support concentrically with the color-wheel, a gear-wheel rotatively mounted on the color-wheel and meshing with the pinion, a spring carried by the color-wheel, means for imparting rotation to the gear-wheel from the tension of said spring, and electromagnetic means controlling the step-by-step movement of the color-wheel.

23. In a light-projecting apparatus, the combination with a support, of a color-wheel rotatively mounted thereon, a pinion mounted stationary on said support concentrically with the color-wheel, a gear-wheel rotatively mounted on the color-wheel eccentrically with the axis of the wheel and meshing with said pinion, and means for imparting rotation to the gear-wheel.

24. In a light-projecting apparatus, the combination with a support, of a color-wheel rotatively mounted on said support, a pinion stationary on the support and concentric with the color-wheel, a gear-wheel rotatively mounted on the color-wheel eccentrically with the axis of said color-wheel and meshing with the pinion, means for rotating said gear-wheel, and means for controlling the step-by-step rotation of the color-wheel.

In testimony whereof I affix my signature in presence of two witnesses.

EDMOND W. SOHLBERG.

Witnesses:
WARREN D. HOUSE,
HENRY C. LAMBERT.